United States Patent
Wang

(10) Patent No.: US 6,442,299 B1
(45) Date of Patent: *Aug. 27, 2002

(54) AUTOMATIC BIT-RATE CONTROLLED ENCODING AND DECODING OF DIGITAL IMAGES

(75) Inventor: Johnny K. Wang, San Jose, CA (US)

(73) Assignee: Divio, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,407

(22) Filed: Oct. 25, 1999

Related U.S. Application Data

(63) Continuation-in-part of application No. 09/263,589, filed on Mar. 5, 1999.
(60) Provisional application No. 60/077,076, filed on Mar. 6, 1998.

(51) Int. Cl.[7] .............................. G06K 9/36; G06K 9/38; G06K 9/46
(52) U.S. Cl. ........................................ 382/251; 382/248
(58) Field of Search ................................. 382/233, 248, 382/250, 251, 166; 375/240.03, 240.18, 240.2, 240.24

(56) References Cited

U.S. PATENT DOCUMENTS

| | | | |
|---|---|---|---|
| 4,302,775 A | | 11/1981 | Widergren .................... 348/406 |
| 5,263,100 A | * | 11/1993 | Kim et al. .................... 382/166 |
| 5,301,242 A | * | 4/1994 | Gonzales et al. ............ 382/239 |
| 5,341,318 A | | 8/1994 | Balkanski .................... 708/402 |
| 5,883,979 A | | 3/1999 | Beretta ........................ 382/251 |
| 5,905,534 A | * | 5/1999 | Sumihiro et al. ...... 375/240.15 |

* cited by examiner

Primary Examiner—Phuoc Tran
(74) Attorney, Agent, or Firm—Townsend and Townsend and Crew LLP

(57) ABSTRACT

New and improved apparatus and methods for encoding and decoding of a series of digital images. The throughput bit rate of conventional systems varies depending upon the complexity of the images. Applying apparatus and methods described herein, encoding and decoding of a series of digital images may be adjusted in an automated manner to achieve a constant throughput bit rate.

6 Claims, 4 Drawing Sheets

AUTOMATIC BIT-RATE CONTROLLED ENCODING AND DECODING OF DIGITAL IMAGES

CROSS-REFERENCES TO RELATED APPLICATIONS

This application claims priority from U.S. Provisional Patent Application No. 60/077,076, filed Mar. 6, 1998, the full disclosure of which is incorporated herein by reference. This application is a CIP of U.S. patent application Ser. No. 09/263,589, filed Mar. 5, 1999, the full disclosure of which is incorporated herein by reference.

BACKGROUND OF THE INVENTION

1. Field of the Invention

The present invention relates to the field of image processing. More specifically, the present invention relates to a method and apparatus for automatically adjusting the rate at which a bit stream is processed.

2. Description of the Related Art

This technique is suitable for widely-used image compression standards that integrate various algorithms into a compression system. Such image compression standards include video compression standards, such as the digital video standards specified by the Motion Picture Experts Group (the MPEG standards), by the Join Photographic Experts Group (the Motion JPEG standard), and by the Digital VCR Conference (the "Blue Book" or DV standard), all of which standards are included herein by reference.

The MPEG, JPEG, and DV standards are distinct compression formats based on discrete cosine transform (DCT) technology. The MPEG (in particular, MPEG-2) standard is currently popular as a distribution format for satellite, cable, terrestrial broadcasting and digital video disc (DVD). The MPEG format uses a compression algorithm that utilizes both intraframe and interframe compression. The JPEG standard is most popularly used as a format for still images, but it may also be applied to video (Motion JPEG). The JPEG format uses only intraframe compression. The DV standard is currently gaining popularity as acquisition format for consumer digital camcorders, as well as professional digital cameras and post-production editing systems. Like the JPEG format, the DV format uses only intraframe compression.

The intraframe compression or encoding process in accordance with the above standards typically proceeds according to the process shown in FIG. 1. FIG. 1 is a flow diagram showing a conventional digital image encoding process (100). In a first step (102), the encoder constructs N×N (typically 8×8) blocks from a digital image input into the encoder. The result is a matrix of image blocks $i(n_1,n_2)$, where $n_1=1,2,3,\ldots,N_1$; $n_2=1,2,3,\ldots,N_2$; $N_1$=the number of rows; and $N_2$ =the number of columns. In a second step (104), the encoder applies a forward transform (typically a cosine related transform) to the matrix of image blocks to generate a matrix of transformed blocks $I(k_1,k_2)$. In a third step (106), the encoder divides the matrix of transformed blocks $I(k_1,k_2)$ by a predetermined, fixed quantization table or matrix $Q(k_1,k_2)$, and subsequently quantizes the result to produce a quantized transformed matrix $S(k_1,k_2)$ which comprises a matrix of symbols. Finally, in a fourth step (108), the encoder applies symbol encoding to transform the matrix of symbols $S(k_1,k_2)$ to an output bit stream.

FIG. 3 is a flow diagram showing a conventional digital image decoding process (300). In a first step (302), the decoder receives an input bit stream and applies symbol decoding to regenerate the symbol matrix representing the quantized transformed matrix $S(k_1,k_2)$. In a second step (304), the decoder multiplies the symbol matrix $S(k_1,k_2)$ by the same predetermined, fixed quantization matrix $Q(k_1,k_2)$ to produce a transformed matirx $I'(k_1,k_2)$. This transformed matrix $I'(k_1,k_2)$ is an approximation of the original transformed matrix $I(k_1,k_2)$, some fidelity having been permanently lost due to the quantization step (106) of the encoding process (100). In a third step (306), an inverse transform is applied to generate an image block matrix $i'(n_1,n_2)$. The image block matrix $i'(n_1,n_2)$ is an approximation of the original image block matrix $i(n_1,n_2)$. Finally, in a fourth step (308), the blocks are merged to form an output digital image which is an approximation of the original image.

SUMMARY OF THE INVENTION

The present invention provides new and improved apparatus and methods for encoding and decoding of a series of digital images. The throughput bit rate of conventional systems varies depending upon the complexity of the images. Applying apparatus and methods of the present invention, encoding and decoding of a series of digital images may be adjusted in an automated manner to achieve a constant throughput bit rate.

For further understanding of the nature and advantages of the present invention, together with other embodiments, reference should be made to the ensuing detailed description taken in conjunction with the accompanying drawings.

DESCRIPTION OF THE SPECIFIC EMBODIMENTS

Figure 1:
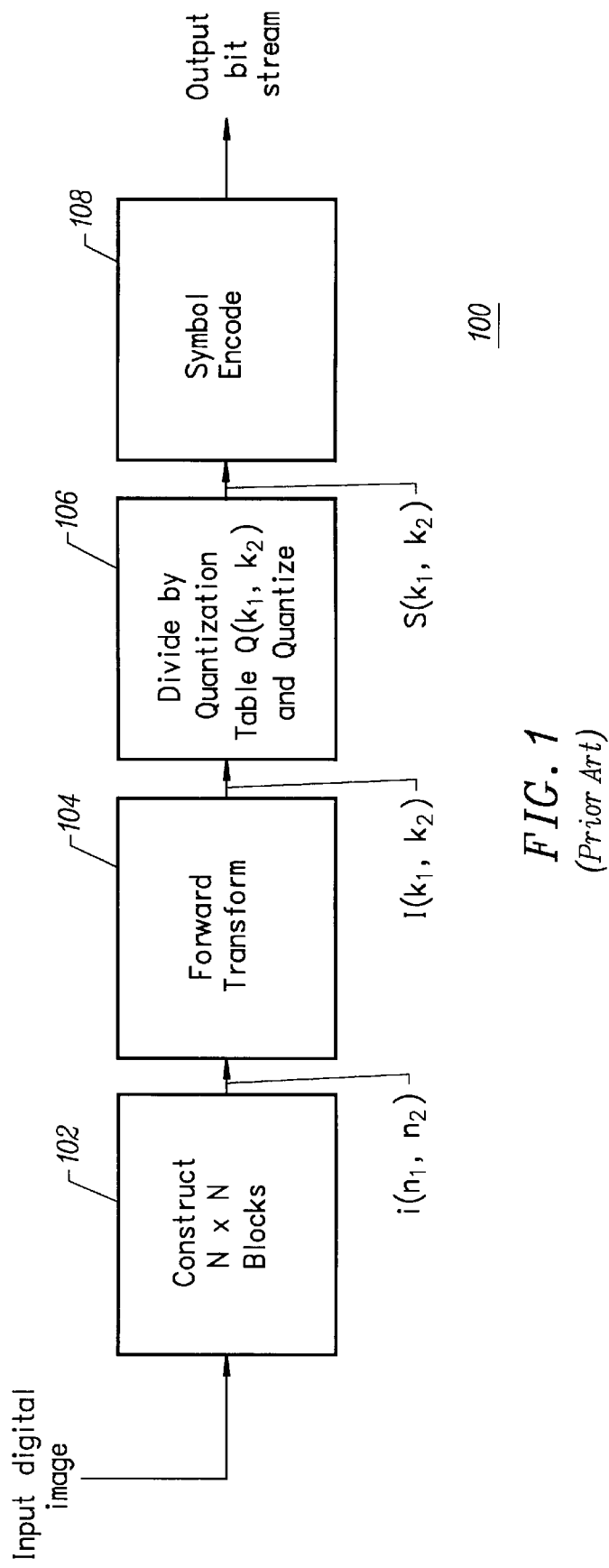
FIG. 1 is a flow diagram showing a conventional digital image encoding process (100).
Figure 2:
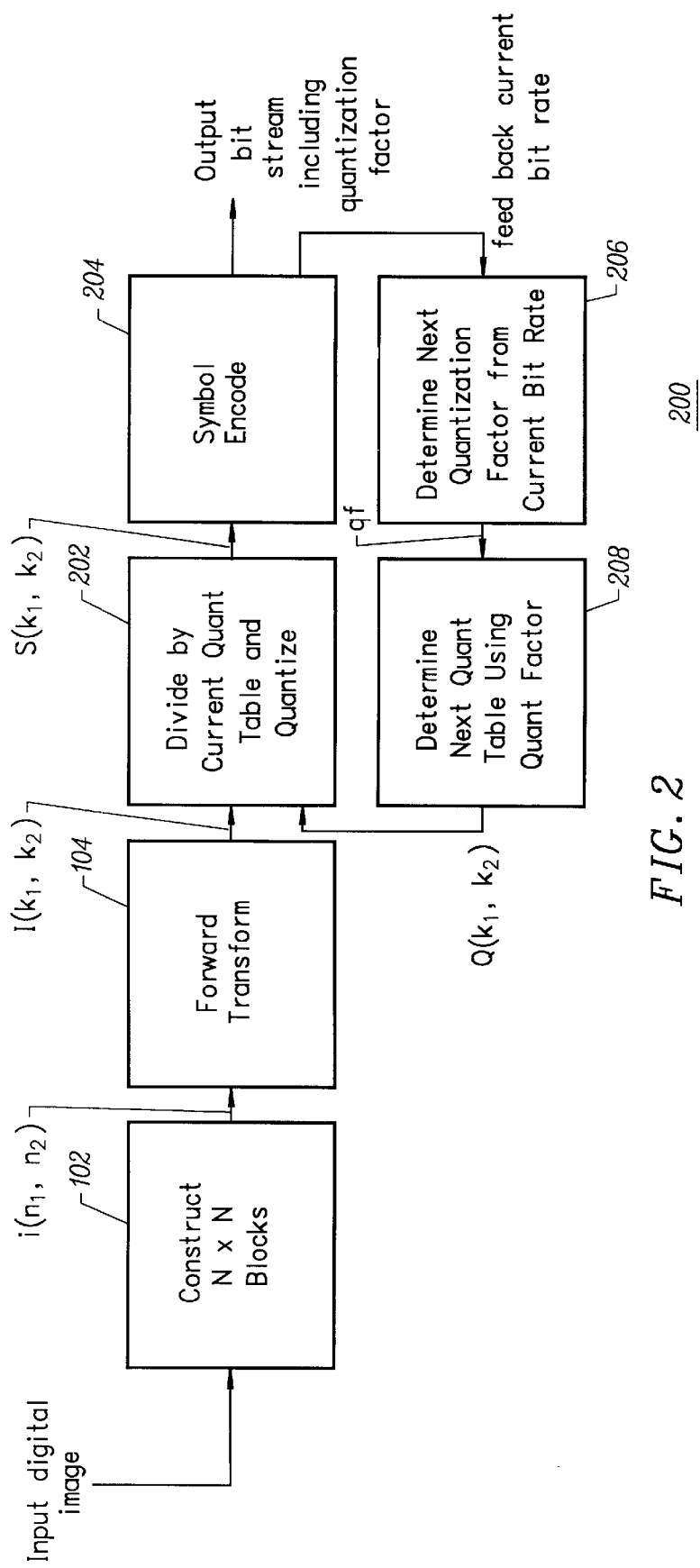
FIG. 2 is a flow diagram showing a digital image encoding process (200) in accordance with a preferred embodiment of the present invention.
Figure 3:
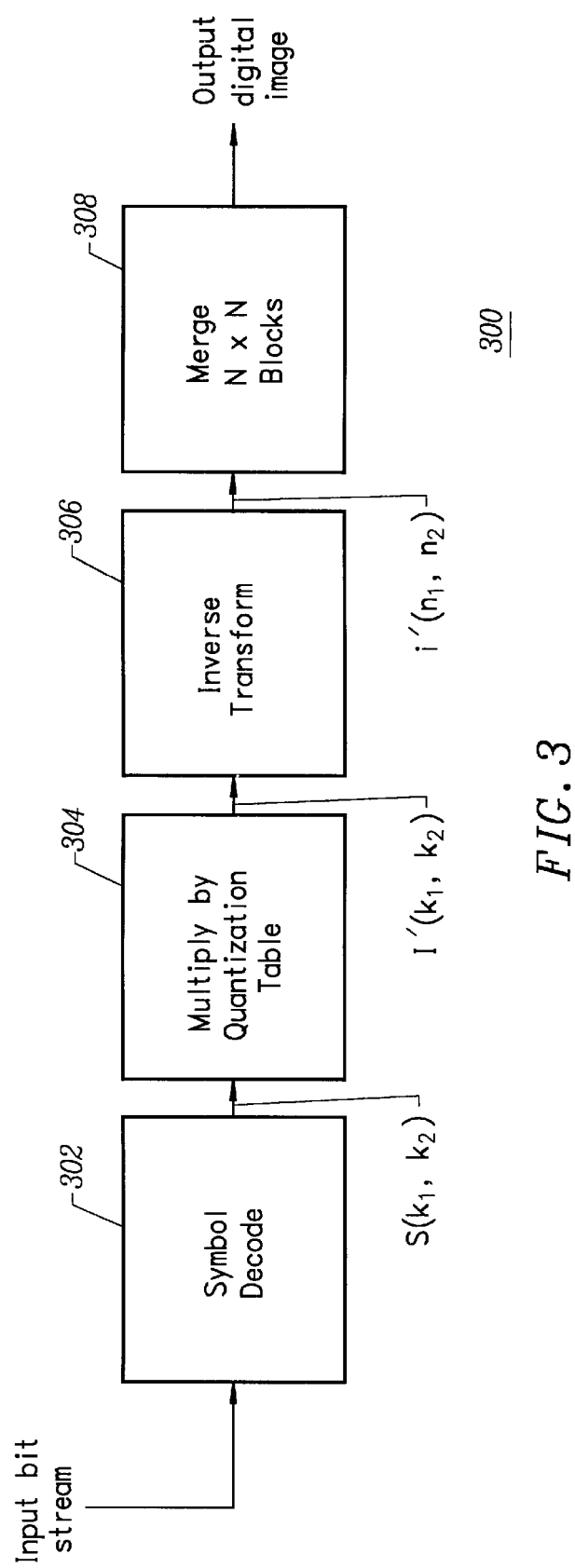
FIG. 3 is a flow diagram showing a conventional digital image decoding process (300).

FIG. 2 is a flow diagram showing a digital image encoding process (200) in accordance with a preferred embodiment of the present invention. The process (200) is similar to the conventional encoding process (100) in that the first two steps (102 and 104) are the same. However, thereafter the processes differ substantially.

In accordance with a preferred embodiment of the present invention, the: third step (202) involves receiving a current quantization matrix or table $Q(k_1,k_2)$. The current quantization matrix $Q(k_1,k_2)$ is not predetermined and fixed, as it is in the conventional process (100). The current quantization matrix $Q(k_1,k_2)$ is used to divide the transformed matrix $I(k_1,k_2)$, and the result is quantized to generate the quantized transformed matrix of symbols $S(k_1,k_2)$.

In a fourth step (204), symbol encoding is applied to generate an output bit stream. However, in addition to outputting the bit stream, the current quantization factor $q_f$ is also output with the bitstream. Furthermore, the current bit rate for the bit stream is fed back to the encoder.

In a fifth step (206), the encoder utilizes the fed back bit rate to determine the next quantization factor $q_f$ by adjustment to the current quantization factor. In a sixth step (208), this next quantization factor $q_f$ is used to determine the next quantization table or matrix $Q(k_1,k_2)$. This next quantization matrix $Q(k_1,k_2)$ becomes the current quantization matrix when it is fed into the third step (202) and used to divide the next transformed matrix $I(k_1,k_2)$.

In a preferred embodiment of the present invention, the next quantization factor $q_f$ is determined using the following equation.

$$q_f = R_{target} * R_{previous} * (b + q_{previous}) - b$$

where $R_{target}$ is the target compression ratio set for the automated process, $R_{previous}$ is the previous compression ratio, $q_{previous}$ is the previous quantization factor, and $b = 1/a = 1/0.234 = 4.27$. Compression ratios are reciprocals of bit rates.

In a preferred embodiment of the present invention, the next quantization matrix $Q(k_1,k_2)$ is determined using the following equations.

$$Q(k_1,k_2) = [Q_{fixed}(k_1,k_2) * q_f]/64 + 0.5$$

where $Q_{fixed}(k_1,k_2)$ may be, for example, a standard quantization table from the JPEG specification.

Figure 4:
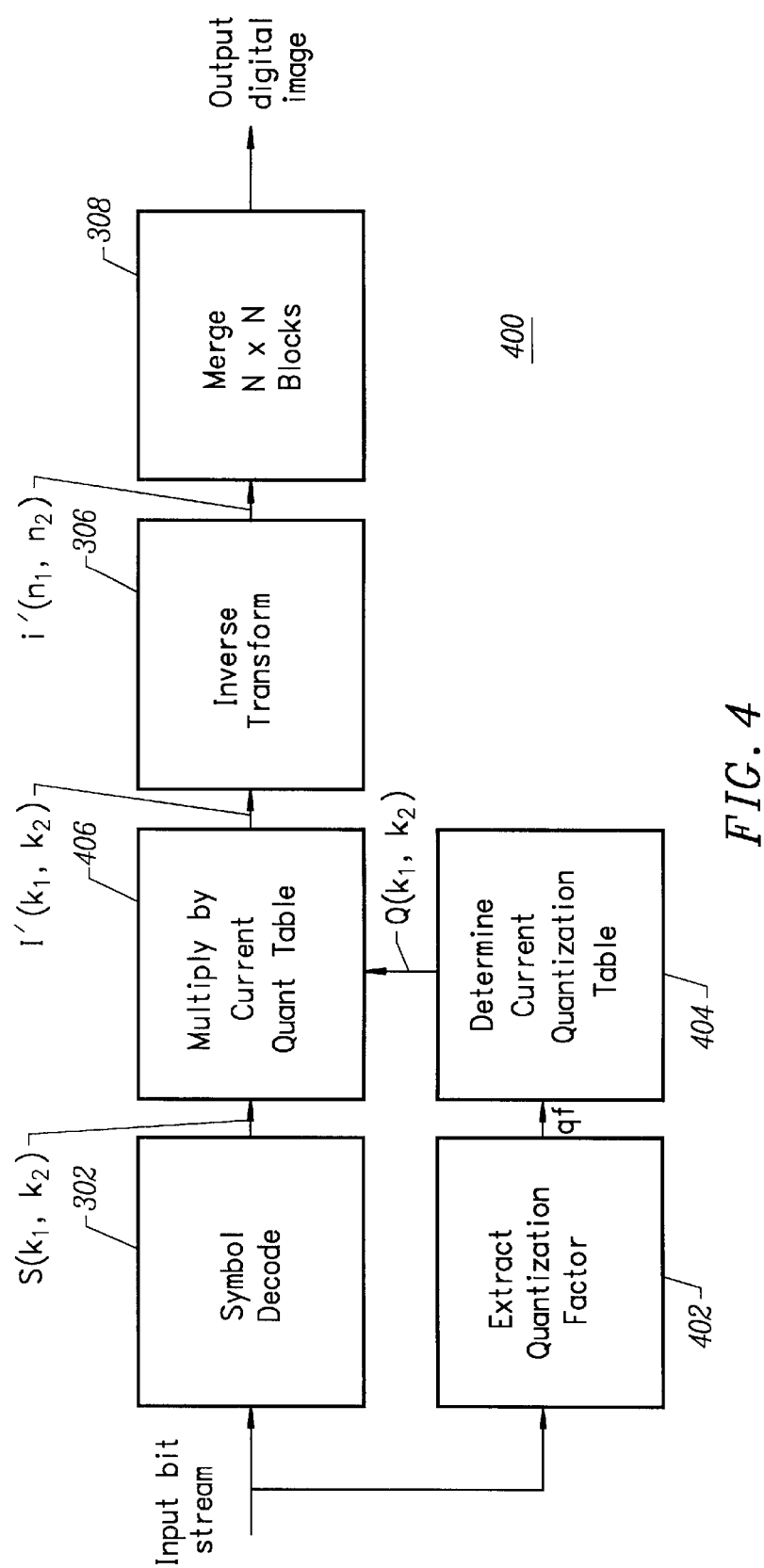
FIG. 4 is a flow diagram showing a digital image decoding process (400) in accordance with a preferred embodiment of the present invention.

FIG. 4 is a flow diagram showing a digital image decoding process (400) in accordance with a preferred embodiment of the present invention. The process (400) is similar to the conventional decoding process (300) in that the basic steps are the same. However, the processes differ is important aspects.

Like the conventional process (200), in a first step (302) symbol decoding is applied to an input bit stream to generate a matrix of symbols $S(k_1,k_2)$. However, here, in a second step (406) the symbol matrix is multiplied by a current quantization table $Q(k_1,k_2)$ rather than a predetermined, fixed quantization table. The current quantization table $Q(k_1, k_2)$ is derived as follows.

First, in parallel to the first step (302), in a first additional step (402), a quantization factor $q_f$ is extracted from the input bit stream. The quantization factor $q_f$ having been output along with the rest of the bit stream in the fourth step (204) of the encoding process in FIG. 2. In a second additional step (404), this quantization factor $q_f$ is used to determine the current quantization table $Q(k_1,k_2)$ for application in the second step (406) discussed above.

As will be understood by those with ordinary skill in the art, the present invention may be embodied in other specific forms without departing from the spirit or essential characteristics thereof.

What is claimed is:

1. A method for lossy compression of a series of digital images, the method comprising:

receiving frequency blocks for a digital image, the frequency blocks including frequency data from a digital image;

dividing the frequency blocks by a quantization table in a quantized manner to generate thresholded and quantized frequency blocks;

symbol encoding the thresholded and quantized frequency blocks to generate a bit stream;

calculating a bit rate for the bit stream;

calculating a quantization factor using the bit rate;

storing a previous quantization factor in memory to generate a recalculated quantization table;

recalculating the quantization table using the quantization factor; and repeating the method for a next digital image.

2. The method of claim 1, further comprising calculating a quantization factor $q_f$, where $q_f$ is a function of $R_{target} * R_{previous} * q_{previous}$, where $R_{target}$ is a target compression ratio, $R_{previous}$ is the previous compression ratio, and $q_{previous}$ is the previous quantization factor.

3. The method of claim 2, wherein $q_f = R_{target} * R_{previous} * (b + q_{previous}) - b$, where b is a constant.

4. The method of claim 1, further comprising storing the recalculated quantization table in a memory.

5. The method of claim 1, further comprising: inserting data representing the quantization factor into the bit stream; and outputting the bit stream.

6. An encoding apparatus operating with the method of claim 1.

* * * * *